United States Patent [19]

Kuder

[11] Patent Number: 4,607,095
[45] Date of Patent: Aug. 19, 1986

[54] NONLINEAR OPTICAL ORGANIC SUBSTRATE

[75] Inventor: James E. Kuder, Fanwood, N.J.

[73] Assignee: Celanese Corporation, New York, N.Y.

[21] Appl. No.: 708,604

[22] Filed: Mar. 5, 1985

[51] Int. Cl.$^4$ .............................................. C08G 75/72
[52] U.S. Cl. ...................................... 528/337; 524/83;
524/606; 524/609; 525/178; 525/183; 525/186
[58] Field of Search ................ 528/337; 525/183, 186, 525/178; 524/83, 606, 609

[56] References Cited

U.S. PATENT DOCUMENTS 4,051,108  9/1977  Helminiak et al. .................. 528/337

Primary Examiner—Harold D. Anderson
Attorney, Agent, or Firm—Depaoli & O'Brien

[57] ABSTRACT

In one embodiment this invention provides a nonlinear optical substrate which comprises a transparent film of an external field-induced noncentrosymmetric macroscopic orientation of poly[[benzo(1,2-d:5,4-d')bisthiazole-2,6-diyl]-1,4-phenylene] molecules:

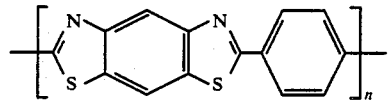

3 Claims, No Drawings

NONLINEAR OPTICAL ORGANIC SUBSTRATE

DESCRIPTION OF THE INVENTION

It is known that organic and polymeric materials with large delocalized π-electron systems can exhibit nonlinear optical response, which in many cases is a much larger response than by inorganic substrates.

In addition, the properties of organic and polymeric materials can be varied to optimize other desirable properties, such as mechanical and thermoxidative stability and high laser damage threshold, with preservation of the electronic interactions responsible for nonlinear optical effects.

One aspect of nonlinear optical organic substrate research involves the investigation of external field-induced dipolar alignment of molecules in a substrate such as a thin film. This has been demonstrated to occur for a guest dye in a polymer host when an electric field is applied to the organic mixture above the glass transition temperature of the polymer host. Noncentrosymmetric polar structures in organic crystals and molecular aggregates have been achieved in this manner. Other alignment methods are based on shear-induced uniaxial orientation of polymeric films and fibers.

Thin films of organic or polymeric materials with large second-order nonlinearities in combination with silicon-based electronic circuitry have potential as systems for laser modulation and deflection, information control in optical circuitry, and the like.

Other novel processes occurring through third-order nonlinearity such as degenerate four-wave mixing, whereby real-time processing of optical fields occurs, have potential utility in such diverse fields as optical communications and integrated circuit fabrication.

Of particular importance for conjugated organic systems is the fact that the origin of the nonlinear effects is the polarization of the π-electron cloud as opposed to displacement or rearrangement of nuclear coordinates found in inorganic materials.

Nonlinear optical properties of organic and polymeric materials was the subject of a symposium sponsored by the ACS division of Polymer Chemistry at the 18th meeting of the American Chemical Society, September 1982. Papers presented at the meeting are published in ACS Symposium Series 233, American Chemical Society, Washington, D.C. 1983.

The above-recited publications are incorporated herein by reference.

Prior art of interest with respect to the present invention are publications relating to polybenzthiazole materials, such as U.S. Pat. Nos. 3,681,297; 4,051,108; 4,108,835; 4,207,407; 4,225,700; 4,359,567; and 4,377,546; incorporated herein by reference.

There is continuing research effort to develop new nonlinear optical organic media for prospective novel phenomena and devices adapted for laser frequency conversion, information control in optical circuitry, light valves and optical switches. The potential utility of organic materials with large second-order and third-order nonlinearities for very high frequency application contrasts with the bandwidth limitations of conventional inorganic electrooptic materials.

Accordingly, it is an object of this invention to provide novel nonlinear optical organic substrates.

It is another object of this invention to provide nonlinear optical organic substrates exhibiting a high Miller's delta value.

It is another object of this invention to provide a solid phase nonlinear organic medium characterized by a high Miller's delta, and a high optical damage threshold.

It is a further object of this invention to provide a nonlinear optical substrate which comprises a noncentrosymmetric configuration of aligned polymer molecules containing repeating charge assymmetric units of conjugated benzothiazole structures.

Other objects and advantages of the present invention shall become apparent from the accompanying description and examples.

DESCRIPTION OF THE INVENTION

One or more objects of the present invention are accomplished by the provision of a nonlinear optical medium comprising a substrate of a polymer corresponding to the formula:

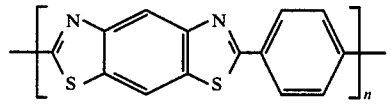

where n is an integer with an average value between about 4–100.

In a further embodiment, this invention provides a nonlinear optical medium comprising a noncentrosymmetric configuration of aligned poly [[benzo(1,2-d:5,4-d')bisthiazole-2,6-diyl]-1,4-phenylene] polymer molecules, wherein the nonlinear optical medium exhibits a Miller's delta of at least about one square meter/coulomb.

The term "Miller's delta" as employed herein with respect to second harmonic generation (SHG) is defined by Garito et al in Chapter 1, "Molecular Optics: Nonlinear Optical Properties Of Organic And Polymeric Crystals"; ACS Symposium Series 233 (1983).

The quantity "delta"(δ) is defined by the equation:

$$d_{ijk} = \epsilon_0 \chi_{ii} \chi_{jj} \chi_{kk} \delta_{ijk}$$

where terms such as $\chi^{(1)}$ are the linear susceptibility components, and $d_{ijk}$, the second harmonic coefficient, is defined through $$\chi_{ijk}^{(2)}(-2\omega; \omega,\omega) = 2\, d_{ijk}(-2\omega; \omega,\omega)$$

The Miller's delta ($10^{-2}$ m$^2$/c at 1.06 μm) of various nonlinear optical crystalline substrates are illustrated by KDP (3.5), LiNbO$_3$ (7.5), GaAs (1.8) and 2-methyl-4-nitroaniline (160).

The term "external field" as employed herein refers to an electric or magnetic field which is applied to a substrate of mobile organic molecules, to induce dipolar alignment of the molecules parallel to the field.

The term "optically transparent" as employed herein refers to a liquid or solid medium which is transparent or light transmitting with respect to incident fundamental light frequencies and harmonic light frequencies. In a laser frequency converter, a present invention nonlinear optical lens medium is transparent to both the incident and exit light frequencies.

The term "charge asymmetric" as employed herein refers to the dipolarity that is characteristic of organic molecules containing an electron-withdrawing group which is in conjugation with an electron-donating group.

Preparation Of
Poly/[benzo(1,2-d:5,4-d')bisthiazole-2,6-diyl]-1,4-phenylene/("PBT analog")

The present invention polymer is an analog of poly/[benzo(1,2-d:4,5-d')bisthiazole-2,6-diyl]-1,4-phenylene/("PBT"):

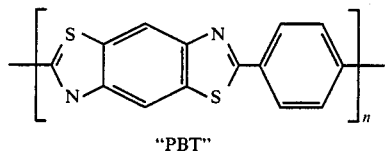

"PBT"

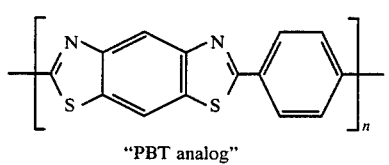

"PBT analog"

The "PBT" polymer is characterized by a repeating benzobisthiazole unit which has a center of symmetry with respect to the conjugated heterocyclic structure, and does not exhibit the polarizability and asymmetric electronic configuration required for second order nonlinearity of optical response to incident light energy.

The present invention "PBT analog" polymer differs from "PBT" in that it is not characterized by a benzobisthiazole structure with a center of symmetry. The "PBT analog" exhibits the π-electron polarizability and charge assymmetry properties required for nonlinear effects in an optically transparent substrate.

The preparation of "PBT" polymers is described in chemical literature such as U.S. Pat. No. 4,225,700.

The preparation of "PBT analog" polymers is described in copending patent application Ser. No. 542,813, filed Oct. 17, 1983; incorporated herein by reference.

A "PBT analog" polymer for purposes of the present invention can be prepared by the condensation of 4,6-diamino-1,3-benzenedithiol with terephthalic acid:

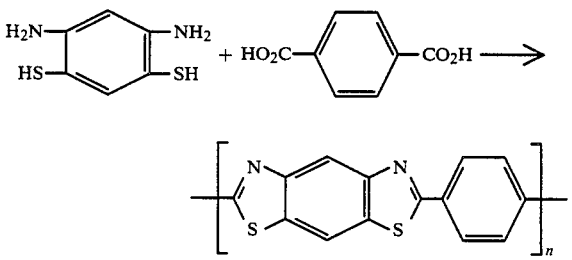

The 4,6-diamino-1,3-benzenedithiol monomer can be derived from m-phenylenediamine by the following series of synthesis steps:

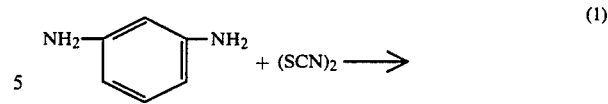  (1)

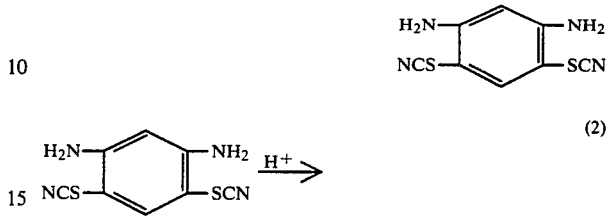  (2)

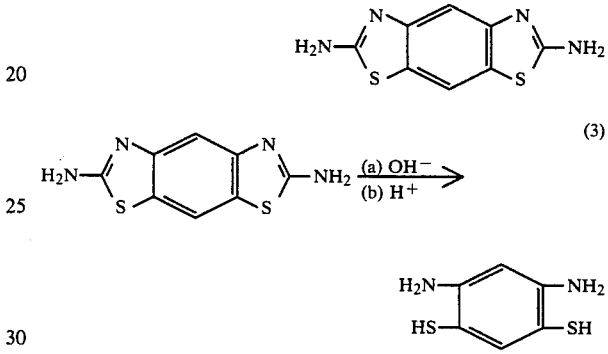  (3)

A "PBT analog" polymer typically will contain between about 4–100 repeating monomeric condensation units, which corresponds to a weight average molecular weight between about 1000–30,000. Molecular weight can be determined by standard techniques not involving the solutioning of the polymer, e.g., by end group determination via infrared spectroscopy on compression molded films. Alternatively, light scattering techniques in a pentafluorophenol solution may be employed to determine the molecular weight.

A "PBT analog" polymer commonly exhibits an inherent viscosity (I.V.) between about 1.0–10.0 dl/g, when dissolved in a concentration of 0.1 percent by weight in pentafluorophenol at 60° C.

A present invention "PBT analog" polymer can be formed into a sheet, film or other shaped form by conventional techniques.

In one method the polymer is dissolved in a suitable solvent such as N,N-dimethylacetamide, N-methylpyrrolidone, hexamethylphosphorictriamide, decalin, xylene, tetrahydrofuran, pentafluorophenol, hexafluoroisopropanol, and the like, and sprayed on a surface.

In another method the polymer is heated to its melt temperature and then extruded into the desired solid form. In another method a solution or melt is cast as a sheet or film, such as with a Doctor Blade procedure.

Techniques for shaping wholly aromatic polymers are described in U.S. Pat. Nos. 4,245,084; 4,332,759; and references cited therein.

A "PBT analog" polymer with a weight average molecular weight between about 10,000–30,000 can form a liquid crystalline solution when dissolved in a solvent such as polyphosphoric acid, methanesulfonic acid or chlorosulfonic acid.

A "PBT analog" polymer can be shaped into an optically transparent substrate which exhibits high strength and excellent thermal stability.

Field-induced Macroscopic Nonlinearity

The electronic origins of nonlinear optical effects in organic π-electronic systems is reviewed by D. J. Williams in Angew. Chem. Int. Ed. Engl., 23, 690 (1984); incorporated herein by reference.

As described in the review article, a technique has been developed for measuring B without necessitating the incorporation of the molecule into noncentrosymmetric crystal structures. In this technique, called electric-field induced second-harmonic generation (EFISH), a strong dc electric field is applied to a liquid or a solution of the molecules of interest in order to remove the orientational averaging by statistical alignment of molecular dipoles in the medium. The induced second-order nonlinearity can then produce a signal at $2\omega$, from which $\beta$ can be extracted.

A schematic diagram of experimental system for measurement of $\beta$ by the EFISH technique is presented in the review article. As illustrated in the published diagram, the 1.06 μm output of a $Nd^{3+}$:YAG laser is split and directed into a sample and a reference cell. The sample cell is translated by a stepped-motor-controlled stage across the beam. The laser pulse is synchronized with a high-voltage dc pulse to induce harmonic generation in the cell. The 0.53 μm radiation is separated from the 1.06 μm pump beam by filters and a monochromator, and the harmonic intensity is detected by a photomultiplier tube. The signal-to-noise ratio can be improved with a boxcar averager. The reference beam is directed into a crystal such as quartz, whose second-order properties are well known, so that fluctuations in beam intensity can be readily corrected in the output data. The value of the nonlinear coefficient is obtained from the ratio of the signals of the sample cell and a reference material such as quartz or $LiNbO_3$ with known $\chi^{(2)}$.

For purposes of the present invention, a "PBT analog" polymer is adapted to exhibit the external field-induced macroscopic nonlinearity required for second order harmonic generation.

Solid Organic Guest-host Substrates

In a further embodiment this invention provides nonlinear optically transparent host polymeric substrates having incorporated therein a distribution of guest "PBT analog" oligomer or polymer molecules.

Illustrative of this type of optical substrate is a polymethyl methacrylate film containing a distribution of "PBT analog" molecules.

If the distribution of guest molecules is random, there is orientational averaging by statistical alignment of the dipolar molecules in the polymeric host, and the optical substrate exhibits third order nonlinearity ($\chi^{(3)}$).

If the distribution of guest molecules is at least partially uniaxial in molecular orientation, then the optical substrate exhibits second order nonlinearity ($\chi^{(2)}$). One method for preparing polymeric films with large second-order nonlinear coefficients is to remove the orientational averaging of a dopant molecule with large $\beta$ by application of an external DC electric field to a softened film. This can be accomplished by heating the film above the host polymer glass-transition temperature $T_g$, then cooling the film below $T_g$ in the presence of the external field. The poling provides the alignment predicted by the Boltzmann distribution law.

The formation of a thin host polymer substrate containing guest molecules having, for example, uniaxial orthogonal molecular orientation can be achieved by inducing a dipolar alignment of the guest molecules in the substrate with an externally applied field of the type described above.

In one method a thin film of the host polymer (e.g., polymethyl methacrylate) containing guest molecules (e.g., "PBT analog" oligomer) is cast between electrode plates. The host polymer substrate then is heated to a temperature above the second order transition temperature of the host polymer. A dc electric field is applied (e.g., at a field strength between about 400–100,000 V/cm) for a period sufficient to align the guest molecules in a unidirectional configuration parallel to the transverse field. Typically the orientation period will be in the range between about one second and one hour, as determined by factors such as guest molecular weight and field strength.

When the orientation of guest molecules is complete, the host polymer substrate is cooled below its second order transition temperature, while the substrate is still under the influence of the applied dc electric field. In this manner the uniaxial molecular orientation of guest molecules is immobilized in a rigid structure.

The uniaxial molecular orientation of the guest molecules in the host polymer substrate can be confirmed by X-ray diffraction analysis. Another method of molecular orientation measurement is by optical characterization, such as optical absorption measurements by means of a spectrophotometer with a linear polarization fixture.

The following examples are further illustrative of the present invention. The components and specific ingredients are presented as being typical, and various modifications can be derived in view of the foregoing disclosure within the scope of the invention.

EXAMPLE I

This Example illustrates the preparation of 4,6-diamino-1,3-benzenethiol.

A.

In each compartment of a two-compartment glass electrolysis cell is placed 75 ml of ethanol-water (2:1) which is 0.3 molar in HCl, and the cell is cooled to 0° C. Carbon electrodes are employed and the anode compartment is equipped with a magnetic stirrer.

To the anode compartment is added m-phenylenediamine (3.24 g, 0.03 mole) and $NH_4SCN$ (11.4 g, 0.15 mole). When the solution is complete, the electrolysis is conducted at a controlled anodic potential of 1.2 V vs SCE (initial current density 15 mA/cm²) until 125% of the theoretically required amount of electricity has passed. The anolyte is removed from the cell, filtered to remove traces of polythiocyanogen, and diluted with an equal volume of water. A 80–90% yield of 4,6-diamino-1,3-benzenedithiocyanide is obtained.

B.

A quantity of 4,6-diamino-1,3-benzenedithiocyanide (2.22 g, 0.01 mole) is refluxed for 30 minutes in 50 ml of 20% HCl. After cooling to room temperature, the solution is diluted with 50 ml of water and treated with $NH_4OH$ to a pH of about 10. 2,6-Diaminobenzobisthiazole precipitate is formed by the above treatment, and is collected by filtration in essentially quantitative yield.

C.

A quantity of 2,6-diaminobenzobisthiazole is converted to the potassium salt of 4,6-diamino-1,3-benzenedithiol by heating at reflux for five hours in 21N potassium hydroxide. On cooling and standing, the potassium salt precipitates and is collected by filtration under nitrogen.

The potassium salt is converted to the dihydrochloride salt by dissolving it in a small quantity of deaerated water and pouring the solution into 3N HCl containing 5% stannous chloride.

The dihydrochloride salt of 4,6-diamino-1,3-benzenedithiol forms as a finely divided solid, and is obtained in crystalline form after heating to 70° C. and adding an equal volume of 12 N HCl. The crystalline product is collected by filtration and washed with diethyl ether.

EXAMPLE II

This Example illustrates the preparation of poly/[-benzo(1,2-d:5,4-d')bisthiazole-2,6-diyl]-1,4-phenylene/("PBT analog").

In accordance with the procedure described in U.S. Pat. No. 4,225,700, a mixture of dihydrochloride salt of 4,6-diamino-1,3-benzenedithiol (15% by weight) in 85% polyphosphoric acid is stirred at room temperature for about 24 hours, and then heated slowly to 70° C. to effect dihydrochlorination.

A stoichiometric quantity of terephthalic acid powder is added to the reaction mixture, and the resultant slurry is heated to 150° C. with stirring until all of the solid terephthalic acid is dissolved.

The temperature of the reaction mixture is raised to 175° C., and maintained at this temperature for about 30 hours to complete the polymerization reaction.

The product mixture is poured into water to precipitate the polymer product. The precipitate is washed successively with ammonium hydroxide and with water, and then dried.

The resultant "PBT analog" polymer has a weight average molecular weight in the range of 10,000-25,000.

EXAMPLE III

This Example illustrates the preparation of a thin substrate of "PBT analog" polymer with a macroscopic noncentrosymmetric molecular orientation in accordance with the present invention.

A poly/[benzo(1,2-d:5,4-d')bisthiazole-2,6-diyl]-1,4-phenylene] polymer as described in Example II is compression molded to form a film of about 500 micron thickness.

The molding is accomplished in a 30 Ton press (Wabash Metal Products, Inc. Model #30-1010-2TMX) with programmed heating and cooling, and adjustable pressure. The platen temperature is set at 290° C. The polymer in particulate form is placed between two Kapton (DuPont polyimide) sheets and positioned between the two platens. The platens are closed and 6 tons pressure is applied for 2 minutes. The platens are then cooled to 230° C. within thirty seconds, the pressure is released, and the film sample is retrieved from the press.

X-ray diffraction patterns from this film sample, recorded by using nickel filtered CuK$_\alpha$ radiation and flat plate photographic techniques, indicate a random orientation of polymer molecule axes.

Molecular alignment of the polymer molecule axes is achieved in the following manner. The film sample is sandwiched between two Kapton films of 0.002 inch thickness which in turn are sandwiched between two metal plates of 0.25 inch thickness, each having a ground flat surface and a rod attached to one side which serves as a contact for application of voltage in the alignment procedure. The sub-assembly is covered on top and bottom with a double layer of Kapton sheets of 0.002 inch thickness and providing a 0.004 inch electrical insulating layer against each platen.

The whole assembly is placed between the platens of the press previously employed for preparing the unoriented precursor film sample. The platens are preheated to 290° C., then closed and a pressure of 6 tons is applied. Wires from a dc power supply are attached to the rods of the electrode plates and a voltage of 700 V is applied for two hours while maintaining temperature and pressure.

The press is cooled rapidly to 150° C. while pressure and voltage are maintained. At that temperature, the voltage is reduced to zero and the pressure released. The molecularly aligned film sample is retrieved from the mold, and X-ray diffraction patterns are recorded with nickel filtered CuK$_\alpha$ radiation and wide-angle photographic flat plate techniques. Orientation functions are determined utilizing a polar table and a microdensitometer interfaced with a LeCray computer.

The data demonstrate that the molecular alignment process results in a rotation of essentially all of the molecular axes of the polymer molecules out of the film plane into a direction parallel to that of the external field. This type of molecularly aligned liquid crystal polymer film is noncentrosymmetric and can function as a second order harmonic-generating nonlinear optical medium for a high intensity light field to which the medium is optically clear, e.g., as the nonlinear optical component in a laser frequency converter device, with a Miller's delta of at least about one square meter/coulomb.

What is claimed is:

1. A nonlinear optical medium comprising a noncentrosymmetric configuration of aligned poly[[benzo(1,2-d:5,4-d')bisthiazole-2,6-diyl]-1,4-phenylene] polymer molecules corresponding to the formula:

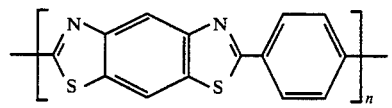

where n is an integer with an average value between about 4–100; wherein the noncentrosymmetric alignment of polymer molecules is induced with an external field, and the nonlinear optical medium exhibits a Miller's delta of at least about one square meter/coulomb.

2. A nonlinear optical medium in accordance with claim 1 wherein the polymer molecules are aligned in a host liquid medium.

3. A nonlinear optical medium in accordance with claim 1 wherein the polymer molecules are aligned in a host solid medium.

* * * * *